United States Patent [19]

Martin

[11] Patent Number: 4,617,443
[45] Date of Patent: Oct. 14, 1986

[54] EDM APPARATUS PULSE GENERATOR

[75] Inventor: Roland Martin, Valleiry, France

[73] Assignee: Charmilles Technologies, S.A., Geneva, Switzerland

[21] Appl. No.: 715,537

[22] Filed: Mar. 25, 1985

Related U.S. Application Data

[63] Continuation of Ser. No. 520,694, Aug. 5, 1983, abandoned.

[30] Foreign Application Priority Data

Aug. 6, 1982 [CH] Switzerland .......................... 4742/82

[51] Int. Cl.⁴ .............................................. B23P 1/02
[52] U.S. Cl. ................................ 219/69 C; 219/69 G; 219/69 M
[58] Field of Search ................... 219/69 P, 69.5, 69 G, 219/69 C, 69 M

[56] References Cited

U.S. PATENT DOCUMENTS 3,283,116 11/1966 Scarpelli .............................. 219/69 P
3,777,108 12/1973 Maillet ................................ 219/69 P
4,382,168 5/1983 Inoue .................................. 219/69 P

*Primary Examiner*—M. H. Paschall
*Attorney, Agent, or Firm*—Hauke and Patalidis

[57] ABSTRACT

An apparatus and method for improving the surface finish of a workpiece machined by an EDM apparatus having an electrode tool mounted in a tool holder insulated from the rest of the apparatus structure, the EDM apparatus comprising a pulse generator applying electrical discharges across the electrode tool and the workpiece, and wherein a parasitical capacitor is formed by the tool holder insulated from the rest of the apparatus. The parasitical capacitor, connected across the pulse generator output, is charged and discharged during operation of the pulse generator, and the discharge energy of the parasitical capacitor is added to the energy of the electrical discharge supplied by the pulse generator. For the purpose of obtaining a smooth surface finish on the workpiece with decreased energy of the machining electrical pulses, a compensating inductance is placed in series in the discharge circuit. The compensating inductance preferably takes the form of a high permeability magnetic circuit disposed around a portion of the discharge circuit, for example around a portion of the electrode tool shank mounting the electrode tool in the tool holder.

11 Claims, 7 Drawing Figures

EDM APPARATUS PULSE GENERATOR

CROSS-REFERENCE TO RELATED APPLICATION

The present application is a continuation of application Ser. No. 520,694, filed Aug. 5, 1983 now abandoned.

BACKGROUND OF THE INVENTION

The present invention relates to an EDM apparatus for machining a workpiece by electrical discharges by means of an electrode tool, and more particlarly the invention relates to an EDM apparatus provided with a pulse generator supplying to the machining zone between the workpiece and the electrode tool current pulses of small energy and of particular shape, for the purpose of obtaining a good surface finish on the machined surface of the workpiece.

In EDM apparatus, the electrode tool is mounted in a tool holder which is generally insulated from the rest of the apparatus. This creates a parasitical capacitance which generally results in some deterioration of the workpiece surface finish. The parasitical capacitance does not present any great inconvenience during rough machining at high material removing rates. However, in the course of finish machining, the parasitical capacitance stores electrical energy which is recovered at each ocurrence of an electrical discharge across the machining zone and which prevents machining with electrical discharges, as provided by the pulse generator, of less energy than the energy stored by the parasitical capacitance.

A variety of solutions have already been proposed for improving as much as possible the workpiece surface finish in the course of EDM finish machining. It has been, among others, suggested to disconnect the high power pulse generator required for initial rough machining of the workpiece and for high rate machining of the workpiece, and to connect across the machining zone a low power pulse generator having a low capacitance at its output. Attempts have also been made to increase as much as possible the capacitance of the cable connecting the pulse generator across the machining zone, and a variety of means have been proposed for controlling the wave form of each current pulse, more particularly for obtaining pulses having a leading front of relatively low slope.

The diverse solutions which have hitherto been proposed are only partially effective because they generally consist of compromises which do not eliminate the parasitical capacitance between the electrode tool and the remaining of the EDM apparatus structure. In order to decrease the parasitical capacitance it has been proposed to insulate not only the electrode tool holder, or machining head, from the rest of the EDM apparatus but, in addition, to insulate the workpiece itself. In such manner, a second parasitical capacitance is created, and the second parasitical capacitance is connected in series with the first parasitical capacitance such that the total capacitance is decreased, as disclosed in German Pat. No. 3,028,309. Such an arrangement results in a costly complication which, in addition, decreases the structural rigidity of the apparatus, which is a great inconvenience when it is desired to machine a workpiece with high accuracy.

Another solution, which is also complex and costly, as disclosed in German Patent No. 3,131,037, consists in partially discharging the parasitical capacitance through a shunt circuit comprising a transistor which must be controlled at high frequency and with highly accurate timing.

SUMMARY OF THE INVENTION

The present invention has for principal object to provide a simple and low cost arrangement permitting to greatly decrease the detrimental effect of an electrode tool holder parasitical capacitance in an EDM apparatus. In order to accomplish its principal object, the EDM apparatus of the invention is provided with an auxiliary inductance connected in series in the discharge circuit of the parasitical capacitance, such discharge circuit comprising the machining head, the frame of the apparatus, the electrode tool and the workpiece.

The diverse objects and advantages of the present invention will become apparent to those skilled in the art when the following description of the best mode contemplated for practicing the invention is read in conjunction with the attached drawing which represents, in a schematic manner and for illustrative purpose, an example of embodiment and modifications of apparatus according to the present invention. In the attached drawing:

DETAILED DESCRIPTION OF THE PREFERRED EMBODIMENTS

Figure 1:
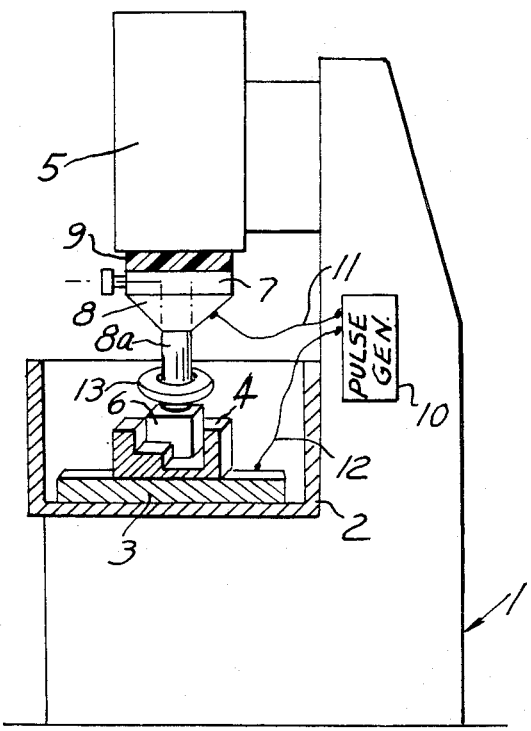
FIG. 1 is a schematic perspective and elevation view of an EDM apparatus according to the present invention, with some portions shown in section.

With reference to FIG. 1, there is schematically illustrated an EDM apparatus comprising a frame structure 1 having a tank 2 in which is disposed a table 3 supporting a workpiece 4. The frame structure 1 carries, at its top, a machining head 5 which comprises an appropriate servo drive for controlling the motion of an electrode tool 6 relative to the workpiece 4, and for maintaining an appropriate machining gap at the machining zone between the electrode tool 6 and the workpiece 4. Servo mechanisms used in EDM apparatus are well know, and a detailed description of such servo mechanisms is not necessary for a clear understanding of the present invention.

The machining head 5, which is movable relative to the apparatus frame structure 1, carries at its bottom the mounting plate 7 of an electrode tool holder 8. The electrode tool holder mounting plate 7 is insulated from the remaining of the machining head 5 by a plate 9 made of dielectric material. The machining current pulses are supplied by a pulse generator 10, which is also well known in the EDM art, and which is connected across the electrode tool holder 8 and the workpiece 4 by a pair of electrical conductors 11 and 12.

It is readily apparent that the electrode tool holder 8 and the apparatus frame structure 1 form a capacitor, and that the majority of the parasitical capacitance of such a capacitor is due to the close spacing between the end face of the machining head 5 and the mounting plate 7 of the electrode tool holder 8. Because the dielectric plate 9 between the machining head 5 and the electrode tool holder mounting plate 7 must be relatively thin such as to not destroy the rigidity of the assembly, the parasitical capacitance is relatively high and is often of the order of 1 microfared.

The electrode tool 6 is mounted in the tool holder 8 by means of a cylindrical shank 8a attached integrally to the electrode tool 6 itself. A closed magnetic circuit in the form of a ring 13 of high magnetic permeability material is disposed around the electrode tool cylindrical shank 8a.

Figure 2:
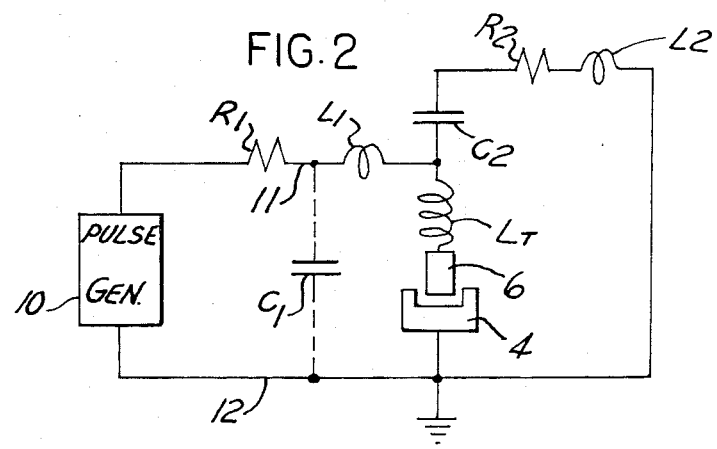
FIG. 2 is an equivalent electrical schematic thereof.

The part played by the parasitical capacitance is explained in detail with reference to FIGS. 2 and 3. FIG. 2 illustrates an equivalent electrical circuit comprising the pulse generator 10 connected across the machining zone between the electrode tool 6 and the workpiece 4 by means of the electrical conductors 11 and 12. The electrical conductors 11 and 12 form an inductor whose inductance is arbitrarily represented in the circuit by a winding L1. The circuit connected across the pulse generator also has a resistance and a capacitance, as represented by resistor R1 and capacitor C1 at FIG. 2.

The parasitical capacitance between the tool holder mounting plate 7 and the machining head 5 appears in a parallel circuit passing through the EDM apparatus frame structure 1, the table 3, the workpiece 4, the machining zone, the electrode tool 6, the electrode tool holder 8 and the electrode tool holder mounting plate 7, FIG. 1. The parasitical capacitance is represented in the equivalent circuit, schematically illustrated at FIG. 2 by a capacitor C2, while the resistance and inductance of the parallel circuit in which the parasitical capacitance is included is represented by a resistor R2 and a winding or inductor L2. The magnetic circuit 13 disposed around the electrode tool shank 8a, FIG. 1, produces an inductance LT, FIG. 2, in series with the electrode tool 6, and it can be seen that the inductance LT decreases the effect of the parasitical capacitance C2.

Figure 3:
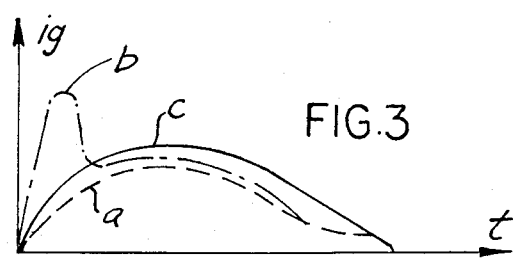
FIG. 3 is a waveform diagram illustrating several current pulse shapes.

FIG. 3 illustrates examples of current pulse waveforms under different conditions. Curve a represents the ideal theoretical waveform provided by the pulse generator 10 in the absence of parasitical capacitance and inductance. Curve b shows the electrical current waveform resulting from the presence of the parasitical capacitance C2, in the case of an EDM apparatus not provided with the inductance LT. Curve c illustrates the electrical current waveform resulting from adapting the arrangement illustrated at FIG. 1, comprising the magnetic circuit ring 13 giving rise to the inductance LT being placed in the circuit.

Every time the pulse generator 10 supplies a voltage pulse at its output, there is a short time delay between the apparition of the voltage pulse until the machining dielectric fluid in the gap is sufficiently ionized to enable a discharge current pulse to flow across the gap between the electrode tool 6 and the workpiece 4. During this short time delay, the capacitor C2, FIG. 2, is charged and when the current pulse is established between the electrode tool and the workpiece, the capacitor C2 is almost instantaneously discharged because the circuit formed by the EDM apparatus frame structure has a very low resistance and a negligible inductance.

The sudden discharge of the capacitor C2 causes the current pulse to have a very sharp leading front, which is the opposite of the ideal pulse which, as mentioned hereinbefore, should be provided with a small slope leading front. The high current intensity flow at the beginning of the pulse has a strong electro-erosive effect upon the workpiece which creates large craters on the machined surface and prevents machining to be effected with a good surface finish.

The impedence LT in the discharge circuit of the capacitor C2 prevents an abrupt increase of the discharge current of the capacitor C2, with the result that the undesirable sharp leading front of the current pulse is avoided. Curve c of FIG. 3, which is the resulting current waveform, shows that the discharge current waveform is very close to the current waveform a provided by the pulse generator 10 discharging in an ideal circuit.

It will be readily appreciated that with respect to electrical equivalence, the inductance LT may be connected anywhere within the discharge circuit of the parasitical capacitor C2. However, for practical reasons, it is difficult to insert an inductance in the portion of the circuit which consists of the apparatus frame structure itself. It would be possible to insulate the workpiece support table 3 from the apparatus frame structure 1 and connect the table 3 to the apparatus frame structure 1 through a coiled electrical conductor disposed below the table. However, such a structure is more expensive than that illustrated at FIG. 1.

In any event, the inductance LT must be chosen to be most effective at high frequencies, such that it is advantageous that the magnetic circuit 13 of FIG. 1 be in the form of a ferrite toroidal member.

Figure 4:
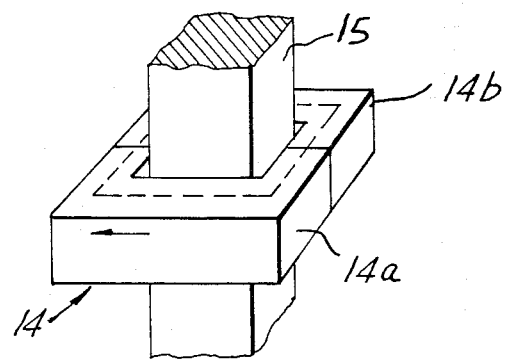
FIGS. 4-7 illustrate modifications of electromagnetic circuits according to the present invention.

FIG. 4 illustrates a ferrite core 14 of rectangular shape, which is appropriate in arrangement wherein the electrode tool shank attached to the tool holder is rectangular in section, as shown at 15. As is clearly shown at FIG. 4, the rectangular ferrite core 14 is disposed as close as possible around the conductive electrode tool shank 15, such as to achieve as high as possible a coefficient of self-inductance. The self-inductance coefficient is also a function of the reluctance of the magnetic circuit, such that it is advantageous to dipsose the ferrite core 14 as close as possible to the conductive tool shank 15, and have the ferrite core extend over as much of the length of the tool shank 15 as practical, for a given volume of the core and for a given permeability of the material used for making the core.

It will be further appreciated that in the example of structure illustrated, the inductance LT is also disposed in the circuit through which flow the electrical discharges supplied by the pulse generator 10. When the EDM apparatus is used for machining at a relatively high machining rate, for example during rough machining or intermediary high-rate machining of the workpiece, the inductance LT in the circuit causes an undesirable effect because, under such conditions, it is preferable to have current pulses of high energy with a sharp waveform front. Different means, however, are available for removing the inductance LT when it is not needed.

As shown at FIG. 4, the magnetic ferrite core 14 is made in two portions 14a and 14b, such that the core may be removed at will from around the electrode tool shank 15.

Figure 5:
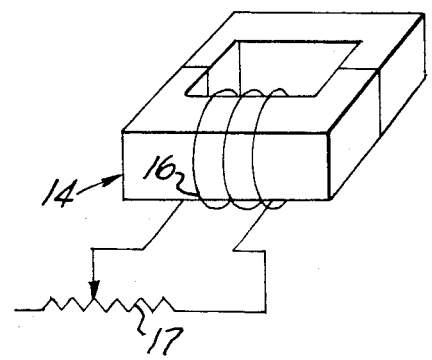

As illustrated at FIG. 5, a magnetic core 14 is provided with a winding 16 connected across a variable resistor 17. By proper adjustment of the variable resistor 17, the effect of the inductance LT may be decreased to a minimum which corresponds to the winding 16 being short-circuited.

Figure 6:
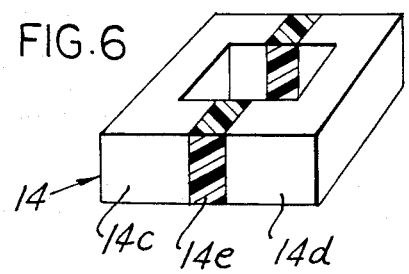

FIG. 6 illustrates a magnetic circuit 14 consisting of a pair of symmetrically disposed high permeability pole pieces 14c and 14d, a pair of symmetrically disposed permanent magnets 14e and 14f being disposed between the pole pieces for polarizing the magnetic circuit. Such a structure is particularly useful when the magnetic field induced by the current pulse flowing through the electrode tool shank is too small or too large relative to the desirable coercivity of the magnetic circuit.

Figure 7:
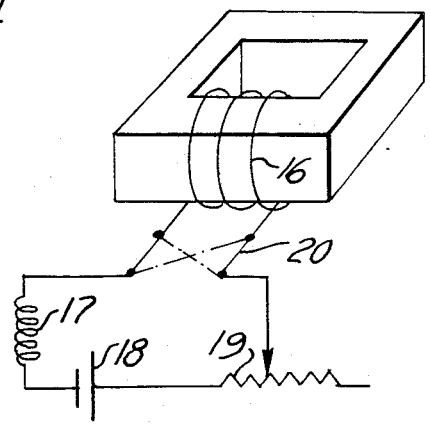

FIG. 7 illustrates another modification of the invention for obtaining magnetic polarization of a core 14. In the modification of FIG. 7, the magnetic circuit of the core 14 comprises a winding 16, connected across a circuit comprising an inductance 17, a current source 18 and an adjustably variable resistor 19, the current flowing through the ciruit from the current source 18 being adjustable as a function of the adjustment of the resistance of the variable resistor 19. A polarization switch 20 may be connected in the circuit to reverse the polarity of the magnetic field induced by the winding 16. The inductance 17 filters out high frequency current induced into the polarization circuit by the current pulses flowing through the electrode tool shank, not shown at FIG. 7.

Having thus described the present invention by way of examples of structure well designed for achieving the objects of the invention, modification whereof will be apparent to those skilled in the art, what is claimed as new is as follows:

1. In an EDM apparatus wherein a workpiece is machined by electro-erosive electrical discharges by means of an electrode tool, said apparatus comprising an electrical pulse generator connected across the workpiece and the electrode tool by electrical conductors for applying voltage pulses of predetermined waveform across a machining zone between the electrode tool and the workpiece for causing machining electrical dischargess across said machining zone, wherein said apparatus comprises a frame structure, a machining head mounted on said frame structure, an electrode tool holder mounted on said machining head, said electrode tool being attached to said tool holder and said electrode tool holder being electrically insulated from said machining head whereby a parasitical capacitance is formed between said electrode tool holder and said machining head, said pulse generator, electrical conductors, workpiece, machining zone and electrode tool defining a workpiece machining circuit, and said parasitical capacitance being charged by said voltage pulses applied across said machining zone prior to said electrical discharges occurring across said machining zone and discharged through a circuit disposed in parallel with said machining circuit and comprising said apparatus frame structure, said machining head, said electrode tool holder, said electrode tool, said machining zone and said workpiece, an improvement comprising an inductance inserted anywhere in the charge and discharge parallel circuit of said parasitical capacitance which comprises said apparatus frame structure, said machining head, said electrode tool holder, said electrode tool, said machining zone and said workpiece only during finish machining of said workpiece by electrical discharges of low energy.

2. The improvement of claim 1 wherein said inductance takes the form of a highly permeable magnetic circuit disposed surrounding a portion of said parallel circuit.

3. The improvement of claim 2 wherein said portion of said parallel circuit is between said electrode tool holder and said electrode tool.

4. The improvement of claim 1 wherein said inductance is variably adjustable.

5. The improvement of claim 4 further comprising a control circuit for controllably varying said inductance.

6. A method for improving surface finish on a workpiece machined by an electrode tool in an EDM apparatus comprising an electrical pulse generator connected across the workpiece and the electrode tool by electrical conductors for applying voltage pulses of predetermined waveform across a machining zone between the electrode tool and the workpiece for causing machining electrical discharges across said machining zone, said pulse generator, electrical conductors, workpiece, machining zone and electrode tool defining a workpiece machining circuit, and wherein said apparatus comprises a frame structure, a machining head mounted on said frame structure, and an electrode tool holder supporting said electrode tool mounted on said machining head, said electrode tool holder being electrically insulated from said machining head whereby a parasitical capacitance is formed between said electrode tool holder and said machining head, said parasitical capacitance being charged by said voltage pulses applied across said machining zone prior to said electrical discharges occurring across said machining zone and discharged through a parallel circuit comprising said apparatus frame structure, said machining head, said electrode tool holder, said electrode tool, said machining zone and said workpiece, said method comprising inserting an inductance anywhere in the parallel charge and discharge circuit of said parasitical capacitance which comprises said apparatus frame structure, said machining head, said electrode tool holder, said electrode tool, and machining zone and said workpiece only during finish machining of said workpiece by electrical discharges of low energy.

7. The method of claim 6 wherein said inductance takes the form of a high permeability magnetic circuit disposed surrounding a portion of said parallel circuit.

8. The method of claim 7 wherein said portion of parallel circuit is between said electrode tool holder and said electrode tool.

9. The method of claim 6 further comprising adjustably varying said inductance as a function of desired surface finish.

10. The method of claim 7 further comprising adjustably varying said inductance as a function of desired surface finish.

11. The method of claim 8 further comprising adjustably varying said inductance as a function of desired surface finish.

* * * * *